(12) United States Patent
Seol et al.

(10) Patent No.: US 12,362,377 B2
(45) Date of Patent: Jul. 15, 2025

(54) ELECTRODE FOR A MEMBRANE-ELECTRODE ASSEMBLY HAVING IMPROVED WATER REPELLENCY AND A METHOD OF MANUFACTURING SAME

(71) Applicants: HYUNDAI MOTOR COMPANY, Seoul (KR); KIA CORPORATION, Seoul (KR)

(72) Inventors: Su Won Seol, Hwaseong-si (KR); Yoon Hwan Cho, Seoul (KR); Ju Young Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 516 days.

(21) Appl. No.: 17/750,914

(22) Filed: May 23, 2022

(65) Prior Publication Data

US 2022/0384832 A1 Dec. 1, 2022

(30) Foreign Application Priority Data

May 25, 2021 (KR) .................. 10-2021-0066636

(51) Int. Cl.
*H01M 8/1004* (2016.01)
*H01M 8/0206* (2016.01)
*H01M 8/10* (2016.01)

(52) U.S. Cl.
CPC ....... *H01M 8/1004* (2013.01); *H01M 8/0206* (2013.01); *H01M 2008/1095* (2013.01)

(58) Field of Classification Search
CPC ............ H01M 8/1004; H01M 8/0206; H01M 2008/1095; H01M 4/8828; H01M 4/8668; H01M 4/88; Y02E 60/50; Y02P 70/50
See application file for complete search history.

(56) References Cited

U.S. PATENT DOCUMENTS

2020/0321622 A1\* 10/2020 Sharman ............. H01M 4/8828

FOREIGN PATENT DOCUMENTS

| JP | 2019169315 A | \* | 10/2019 |
| KR | 20100068029 A | \* | 6/2010 |
| KR | 101458817 B1 | | 11/2014 |
| KR | 101536062 B1 | | 7/2015 |
| KR | 20190077736 A | \* | 7/2019 |

\* cited by examiner

*Primary Examiner* — Daniel S Gatewood
(74) *Attorney, Agent, or Firm* — Lempia Summerfield Katz LLC

(57) ABSTRACT

Disclosed is an electrode for a membrane-electrode assembly, in which a hydrophilic group and a hydrophobic portion of an ionomer are bonded to a catalyst so that the alignment of the hydrophilic group and the hydrophobic portion of the ionomer is controlled, and a method of manufacturing the same.

15 Claims, 4 Drawing Sheets

ELECTRODE FOR A MEMBRANE-ELECTRODE ASSEMBLY HAVING IMPROVED WATER REPELLENCY AND A METHOD OF MANUFACTURING SAME

CROSS REFERENCE TO RELATED APPLICATION

The present application claims the benefit of and priority to Korean Patent Application No. 10-2021-0066636, filed May 25, 2021, the entire contents of which are incorporated herein by reference.

BACKGROUND

1. Field of the Present Disclosure

The present disclosure relates to an electrode for a membrane-electrode assembly and a method of manufacturing the same.

2. Description of the Related Art

The statements in this section merely provide background information related to the present disclosure and may not constitute prior art.

In general, a polymer electrolyte membrane fuel cell (PEMFC) has been widely used as a fuel cell for automobiles. In order for this polymer electrolyte membrane fuel cell to properly effectuate high output performance of at least several tens of kW under various driving conditions of automobiles, the polymer electrolyte membrane fuel cell needs to be stably operated in a wide current density range.

The reaction for generating electricity of the fuel cell occurs in a membrane-electrode assembly (MEA) including a perfluorinated sulfonic acid (PFSA) ionomer-based electrolyte membrane and anode/cathode electrodes. After hydrogen supplied to an anode, which is an oxidation electrode of the fuel cell, the hydrogen is separated into hydrogen ions (protons) and electrons, the hydrogen ions move toward a cathode, which is a reducing electrode, through a membrane, and the electrons move to the cathode through an external circuit. In the cathode, oxygen molecules, hydrogen ions, and electrons are reacted together to generate electricity and also generate water ($H_2O$) as a reaction byproduct and heat.

The electrode of the membrane-electrode assembly includes a catalyst and an ionomer that acts as a binder. The ionomer is a polymer material having a main chain and a side chain, and a functional group such as a sulfonic acid group is attached to an end thereof. Specifically, the main chain and the side chain are hydrophobic, and the functional group is hydrophilic.

As the hydrophilic functional group approaches the catalyst, hydrogen ions smoothly move in the electrode. Further, as the hydrophobic main chain and side chain move away from the catalyst, the water repellency in the electrode is improved, which facilitates the discharge of water. Accordingly, flooding can be effectively suppressed.

However, we have discovered that in a conventional technology, a catalyst and an ionomer are simply mixed to form an electrode. Accordingly, since the hydrophilic portion and the hydrophobic portion of the ionomer are randomly attached to the catalyst, the above effect cannot be effectively utilized.

SUMMARY OF THE DISCLOSURE

The present disclosure provides an electrode, in which the alignment of a hydrophilic portion and a hydrophobic portion of an ionomer toward a catalyst is controlled to improve performance, and a method of manufacturing the same.

In another form, the present disclosure provides an electrode reducing the amount of ionomers used and a method of manufacturing the same.

The objectives of the present disclosure are not limited to the above-mentioned objectives. The objectives of the present disclosure will become more apparent from the following description, and will be realized by the means described in the claims and combinations thereof.

A method of manufacturing an electrode for a membrane-electrode assembly according to an embodiment of the present disclosure may include: preparing a dispersion solution containing an ionomer having a hydrophilic group attached to an end of a side chain thereof, adding a metal salt to the dispersion solution to manufacture a mixture, adding a catalyst to the mixture to manufacture a catalyst slurry, heat-treating the catalyst slurry, treating the heat-treated catalyst slurry using acid, and applying a resultant material to manufacture the electrode.

The hydrophilic group may include at least one selected from the group consisting of a hydroxyl group, a carboxyl group, a nitro group, a sulfonic acid group, and a combination thereof.

The ionomer may include at least one selected from the group consisting of S—PI (sulfonated polyimide), S-PAES (sulfonated polyarylethersulfone), S-PEEK (sulfonated polyetheretherketone), perfluorosulfonic acid resin (perfluorosulfonic acid, PFSA), sulfonated polybenzimidazole (S—PBI), sulfonated polysulfone (S—PSU), sulfonated polystyrene (S—PS), sulfonated polyphosphazene, and a combination thereof.

The dispersion solution may include 5 to 20 wt % of the ionomer.

In the manufacturing method, the metal salt may be added in an amount of 50 to 200 parts by weight based on 100 parts by weight of the ionomer, thus manufacturing the mixture.

In the manufacturing method, the mixture may be agitated to attach metal ions of the metal salt to the hydrophilic group of the ionomer.

The catalyst may be a platinum catalyst, or an alloy catalyst containing platinum and at least one transition metal selected from the group consisting of cobalt (Co), nickel (Ni), manganese (Mn), iron (Fe), chromium (Cr), and a combination thereof.

The catalyst may be the alloy catalyst containing platinum and at least one transition metal selected from the group consisting of cobalt (Co), nickel (Ni), manganese (Mn), iron (Fe), chromium (Cr), and a combination thereof, and a metal salt may include the same kind of metal as the transition metal of the alloy catalyst.

The catalyst slurry may include 50 to 90 wt % of the catalyst and 10 to 50 wt % of the mixture.

The manufacturing method may further include drying the catalyst slurry before the heat-treating.

In the manufacturing method, the catalyst slurry may be heat-treated for 2 to 5 hours at a temperature that is higher by from 10 to 20° C. than a glass transition temperature (Tg) of the ionomer.

In the manufacturing method, the catalyst slurry may be heat-treated so that the hydrophilic group attached to the ionomer is aligned toward the catalyst.

In the manufacturing method, the heat-treated catalyst slurry may be treated using the acid to remove metal ions resulting from the metal salt.

An electrode for a membrane-electrode assembly according to an embodiment of the present disclosure may include a catalyst, and an ionomer having a hydrophilic group attached to an end of a side chain thereof. The hydrophilic group may be aligned toward the catalyst.

According to the present disclosure, a large amount of water is present in the complex of a catalyst and an ionomer due to the hydrophilic portion of the ionomer. Water is discharged due to the hydrophobic portion of the ionomer between the adjacent complexes, so a flooding problem is overcome. Accordingly, the performance and durability of the membrane-electrode assembly are improved.

According to the present disclosure, since the directionality of the hydrophilic portion and the hydrophobic portion of the ionomer attached to the catalyst is capable of being controlled, it is possible to minimize the amount of the ionomer that is added by placing the ionomer in the right place.

The effects of the present disclosure are not limited to the above-mentioned effects. It should be understood that the effects of the present disclosure include all effects that can be inferred from the following description.

BRIEF DESCRIPTION OF THE DRAWINGS

The above and other objectives, features, and advantages of the present disclosure will be more clearly understood from the following detailed description taken in conjunction with the accompanying drawings, in which.

Figure 1:
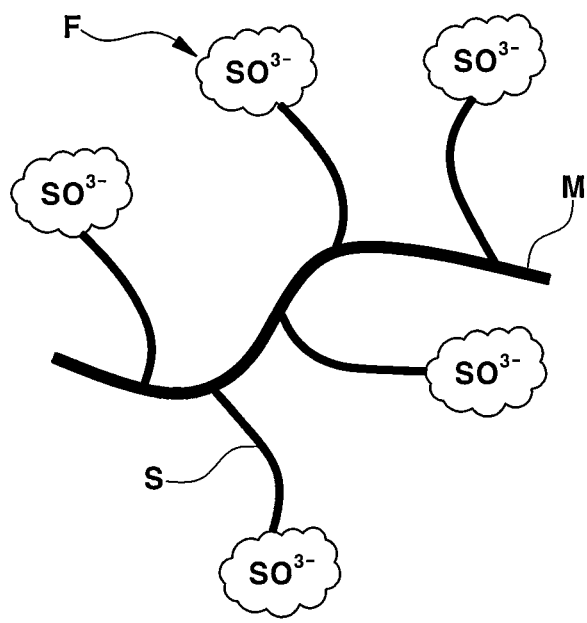
FIG. 1 schematically shows an ionomer according to one form of the present disclosure.

The drawings described herein are for illustration purposes only and are not intended to limit the scope of the present disclosure in any way.

DESCRIPTION OF THE PRESENT DISCLOSURE

The above objectives, other objectives, features, and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

In describing each drawing, similar reference numerals have been used for similar elements. In the accompanying drawings, the dimensions of the structures are shown to be enlarged than they actually are for the purpose of clarity of the present disclosure. Terms such as first and second may be used to describe various elements, but the elements should not be limited by the terms. The above terms are used only for the purpose of distinguishing one element from another element. For example, without departing from the scope of the present disclosure, a first element may be referred to as a second element, and similarly, a second element may be referred to as a first element. Singular expressions include plural expressions unless the context clearly indicates otherwise.

In the present disclosure, it is to be understood that terms such as "include" or "have" are intended to designate the presence of features, numbers, steps, actions, elements, parts, or combinations thereof described in the specification, but do not preclude the possibility of the presence or addition of one or more other features, numbers, steps, actions, elements, parts, or combinations thereof. Further, when a part such as a layer, a film, a region, and a plate is said to be "on" another part, this includes cases where one part is "directly on" the other part, as well as cases where there is another part therebetween. Conversely, when a part such as a layer, a film, a region, and a plate is said to be "under" another part, this includes cases where one part is "directly under" the other part, as well as cases where there is another part therebetween.

Unless otherwise specified, all numbers, values, and/or expressions expressing ingredients, reaction conditions, polymer compositions, and quantities of formulations used in the present disclosure are approximations that reflect the various uncertainties in the measurement inherently occurring in obtaining these values among others. Accordingly, it should be understood as being modified in all cases by the term "about". Further, when numerical ranges are disclosed herein, such ranges are continuous and, unless otherwise indicated, include all values from the minimum to the maximum values within the ranges. Moreover, when such ranges refer to an integer, all integers including the minimum to the maximum values are included therein, unless otherwise indicated.

A method of manufacturing an electrode for a membrane-electrode assembly according to the present disclosure may include preparing a dispersion solution containing an ionomer, adding a metal salt to the dispersion solution to manufacture a mixture, adding a catalyst to the mixture to manufacture a catalyst slurry, heat-treating the catalyst slurry, treating the heat-treated catalyst slurry using acid, and applying a resultant material to manufacture the electrode.

FIG. 1 schematically shows an ionomer according to one form of the present disclosure. Referring to this, the ionomer may include a polymer material having a main chain M and a side chain S, and may include a hydrophilic group F at an end of the side chain S thereof.

The main chain M and the side chain S are alkyl groups substituted with a fluorine element, and may be hydrophobic.

The hydrophilic group F is a hydrophilic functional group substituted at the end of the side chain S thereof. The hydrophilic group may include at least one selected from the group consisting of a hydroxyl group, a carboxyl group, a nitro group, a sulfonic acid group, and a combination thereof, and may include a sulfonic acid group.

The ionomer may include at least one selected from the group consisting of S—PI (sulfonated polyimide), S-PAES (sulfonated polyarylethersulfone), S-PEEK (sulfonated polyetheretherketone), perfluorosulfonic acid resin (perfluorosulfonic acid, PFSA), sulfonated polybenzimidazole (S—PBI), sulfonated polysulfone (S—PSU), sulfonated polystyrene (S—PS), sulfonated polyphosphazene, and a combination thereof.

The concentration of the dispersion solution is not particularly limited, but the dispersion solution may include the ionomer in an amount of 5 to 20 wt %.

Figure 2:
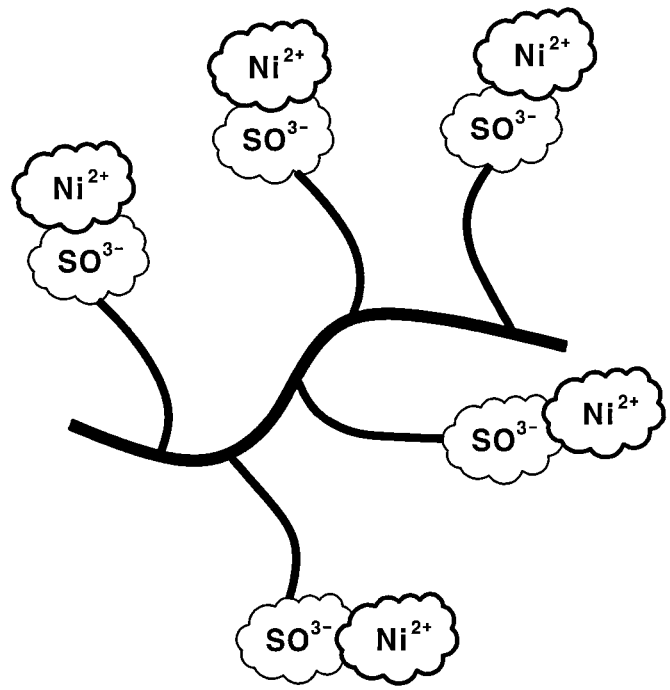
FIG. 2 shows that a mixture manufactured by adding a metal salt to a dispersion solution is agitated to attach metal ions of the metal salt to the hydrophilic group of the ionomer in another form of the present disclosure.

A metal salt may be added to the dispersion solution to manufacture a mixture. The mixture may be agitated under a specific condition to attach the metal ions of the metal salt to the hydrophilic group of the ionomer as shown in FIG. 2.

The metal salt may include the same kind of metal as the metal contained in the catalyst. In the present disclosure, the ions of the same kind of metal as the metal contained in the catalyst are attached to the hydrophilic group of the ionomer, so that the hydrophilic group of the ionomer is aligned toward the catalyst in a heat treatment step as described below.

The amount of the metal salt that is added is not particularly limited, but the metal salt may be added in an amount of 50 to 200 parts by weight based on 100 parts by weight of the ionomer. The amount of the metal salt added may be appropriately adjusted based on the amount of the sulfonic acid group of the ionomer.

The mixture may be sufficiently agitated at from 40 to 80° C. for about 20 hours or more so that the metal ions of the metal salt are sufficiently attached to the hydrophilic group of the ionomer.

The catalyst may be added to the mixture to manufacture the catalyst slurry.

The catalyst may include a platinum catalyst or an alloy catalyst.

The alloy catalyst may include platinum and at least one transition metal selected from the group consisting of cobalt (Co), nickel (Ni), manganese (Mn), iron (Fe), chromium (Cr), and a combination thereof.

When the catalyst is the platinum catalyst, the metal salt may include a platinum salt. For example, the metal salt may include platinum nitrate or platinum hydrochloride.

When the catalyst is an alloy catalyst, the metal salt may include a salt of the transition metal. For example, the metal salt may include nickel nitrate, nickel hydrochloride, cobalt nitrate, or cobalt hydrochloride.

Figure 3:
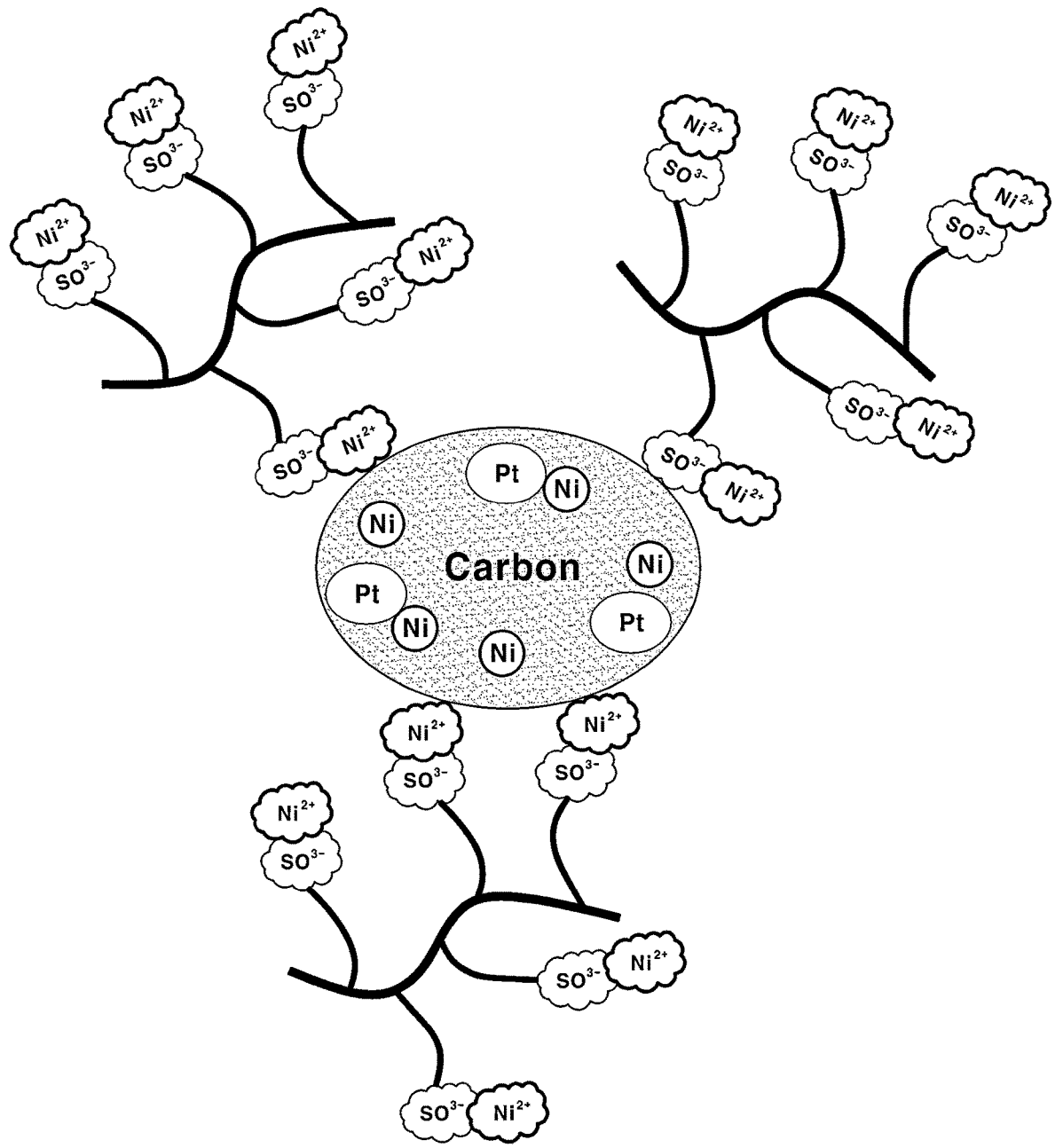
FIG. 3 schematically shows a complex including a catalyst and the ionomer obtained by adding the catalyst to the mixture and performing dispersion in other form of the present disclosure.

When the catalyst is added to the mixture and dispersed therein, a kind of complex including the catalyst and the ionomer is formed as shown in FIG. 3.

The method of dispersing the catalyst is not particularly limited, and for example, ultrasonic waves may be radiated to evenly disperse the catalyst.

The dispersion condition of the catalyst is not particularly limited, and for example, the catalyst may be dispersed at 20 to 30° C. for about 24 hours or more.

The catalyst slurry may include 50 to 90 wt % of the catalyst and 10 to 50 wt % of the mixture. However, the ratio thereof may be appropriately adjusted based on the content of the ionomer included in the mixture.

After the catalyst slurry is manufactured, the catalyst slurry may be dried. A drying condition thereof is not particularly limited, but the catalyst slurry may be dried at from 60 to 80° C. for about 20 hours or more so that the solvent is sufficiently removed.

Figure 4:
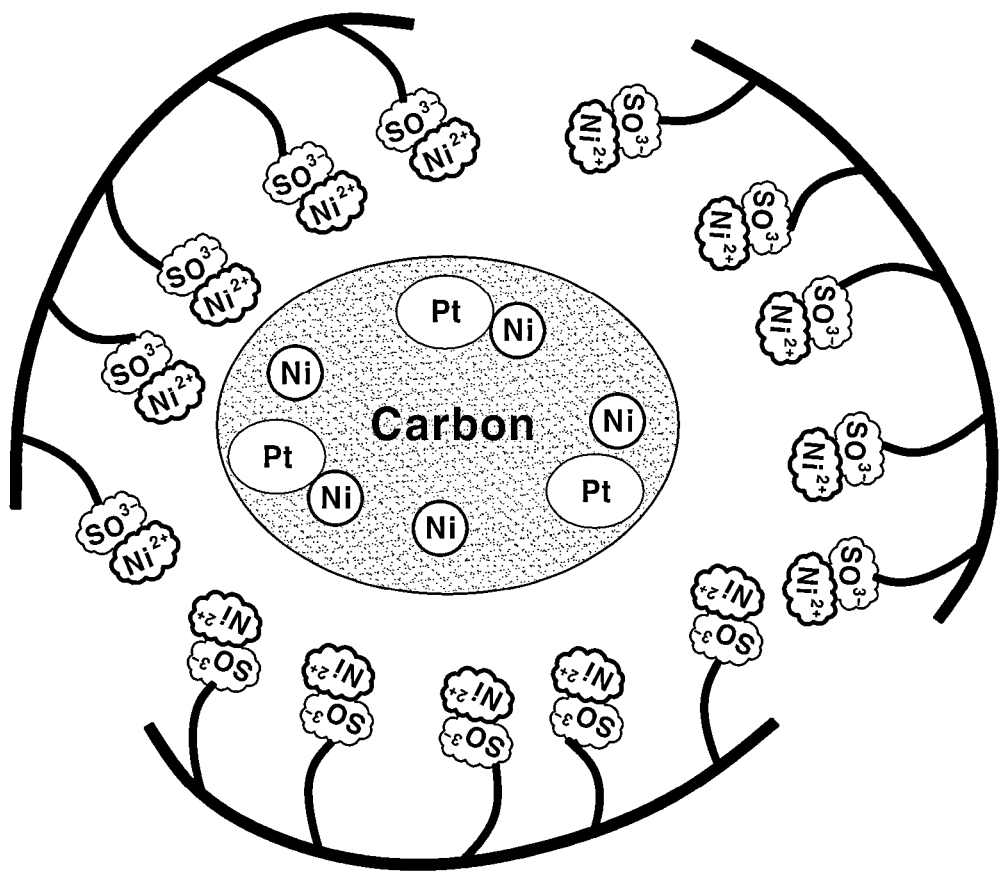
FIG. 4 shows that a catalyst slurry is heat-treated so that the hydrophilic group attached to the ionomer is aligned toward the catalyst in one form of the present disclosure.

Thereafter, the catalyst slurry may be heat-treated so that the hydrophilic group attached to the ionomer is aligned toward the catalyst as shown in FIG. 4. During the heat treatment, the metal attached to the hydrophilic group of the ionomer moves for bonding with the same kind of metal as the catalyst. In one form, microparticles having a size of several nanometers tend to agglomerate in the same types in order to minimize surface energy. Further, when the ionomer is exposed to a temperature that is higher than the glass transition temperature (Tg), the polymer structure may flow and move. As a result, the metal ions attached to the end of the ionomer may move for bonding with other particles together.

The heat treatment may be performed for 2 to 5 hours at a temperature that is higher by 10 to 20° C. than the glass transition temperature (Tg) of the ionomer. In one form, the catalyst slurry may be heat-treated at a temperature of 180 to 250° C.

Figure 5:
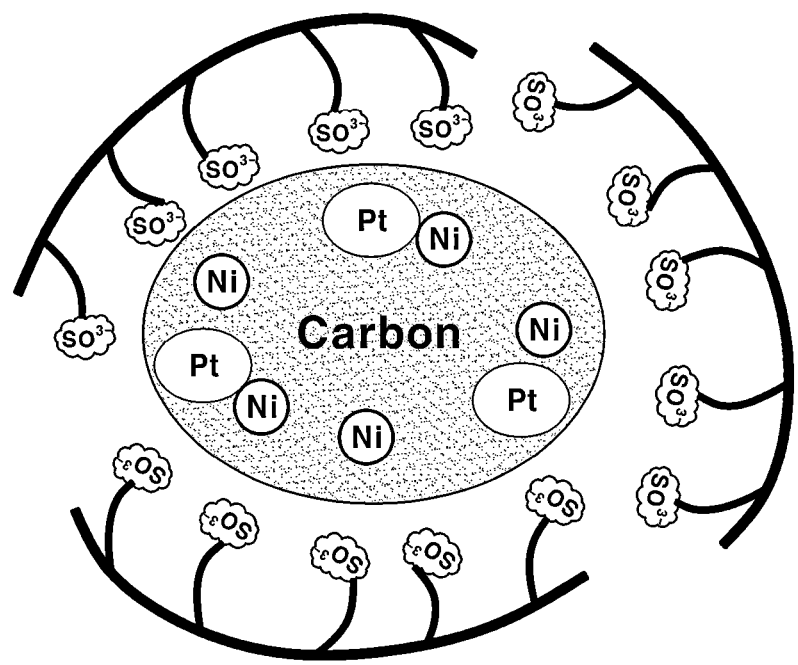
FIG. 5 shows that the heat-treated catalyst slurry is treated using acid to remove the metal ions attached to the hydrophilic group of the ionomer.

The catalyst slurry that is heat-treated may be hardened in the form of a kind of cake or flakes, and may be treated with acid, thus removing the metal ions attached to the hydrophilic group of the ionomer as shown in FIG. 5.

The condition of the acid treatment is not particularly limited, but the cake or flakes may be placed in a 0.2 M to 0.5 M sulfuric acid solution and sufficiently agitated at a temperature of from 50 to 80° C. within about 2 hours.

The cake or flakes treated using acid as shown in FIG. 5 may be washed several times with distilled water and dried to wash out the acid solution.

Thereafter, the cake or flakes may be dispersed in a solvent and additives such as antioxidants may be added to manufacture an electrode slurry.

Further, the electrode slurry may be applied on a substrate to manufacture an electrode for a membrane-electrode assembly.

The electrode for the membrane-electrode assembly according to the present disclosure manufactured using the above method may include the catalyst and the ionomer having the hydrophilic group attached to the end of the side chain thereof, and the hydrophilic group of the ionomer may be aligned toward the catalyst.

According to the present disclosure, the catalyst and the ionomer may form a kind of complex as shown in FIG. 5. The main chain and the side chain of the ionomer are located on the outside of the complex to exhibit hydrophobicity, and the hydrophilic group attached to the end of the side chain of the ionomer is located at the interface between the catalyst and the ionomer. Therefore, the hydrophobicity is increased between the adjacent complexes, so that water is easily discharged from the electrode, thereby overcoming the problem of flooding. Further, since the catalyst and the hydrophilic group are adjacent to each other, hydrogen ions are capable of smoothly moving in the electrode.

Although the various embodiments of the present disclosure have been disclosed for illustrative purposes, those skilled in the art will appreciate that various modifications, additions and substitutions are possible, without departing from the scope and spirit of the present disclosure.

What is claimed is:

1. A method of manufacturing an electrode for a membrane-electrode assembly, the method comprising:
preparing a dispersion solution containing an ionomer having a hydrophilic group attached to an end of a side chain thereof;
adding a metal salt to the dispersion solution to manufacture a mixture;
adding a catalyst to the mixture to manufacture a catalyst slurry;
heat-treating the catalyst slurry;
treating the heat-treated catalyst slurry using acid; and
applying a resultant material to manufacture the electrode, wherein metal ions of the metal salt are attached to the hydrophilic group of the ionomer in the mixture, and wherein the catalyst slurry is heat-treated so that the hydrophilic group attached to the ionomer is aligned toward the catalyst.

2. The method of claim 1, wherein the hydrophilic group includes at least one selected from the group consisting of a hydroxyl group, a carboxyl group, a nitro group, a sulfonic acid group, and a combination thereof.

3. The method of claim 1, wherein the ionomer includes at least one selected from the group consisting of sulfonated polyimide (S—PI), sulfonated polyarylethersulfone (S-PAES), sulfonated polyetheretherketone (S-PEEK), perfluorosulfonic acid resin (perfluorosulfonic acid, PFSA), sulfonated polybenzimidazole (S—PBI), sulfonated polysulfone (S—PSU), sulfonated polystyrene (S—PS), sulfonated polyphosphazene, and a combination thereof.

4. The method of claim 1, wherein the dispersion solution includes from 5 to 20 wt % of the ionomer.

5. The method of claim 1, wherein the metal salt is added in an amount of from 50 to 200 parts by weight based on 100 parts by weight of the ionomer, thus manufacturing the mixture.

6. The method of claim 1, wherein the catalyst is a platinum catalyst, or an alloy catalyst containing platinum and at least one transition metal selected from the group consisting of cobalt (Co), nickel (Ni), manganese (Mn), iron (Fe), chromium (Cr), and a combination thereof.

7. The method of claim 6, wherein the catalyst is the alloy catalyst containing platinum and at least one transition metal selected from the group consisting of cobalt (Co), nickel (Ni), manganese (Mn), iron (Fe), chromium (Cr), and a combination thereof, and wherein a metal salt includes a same kind of metal as the transition metal of the alloy catalyst.

8. The method of claim 1, wherein the catalyst slurry includes from 50 to 90 wt % of the catalyst and from 10 to 50 wt % of the mixture.

9. The method of claim 1, further comprising:

drying the catalyst slurry before the heat-treating.

10. The method of claim 1, wherein the catalyst slurry is heat-treated for from 2 to 5 hours at a temperature that is higher by from 10 to 20° C. than a glass transition temperature (Tg) of the ionomer.

11. The method of claim 1, wherein the heat-treated catalyst slurry is treated using the acid to remove the metal ions resulting from the metal salt.

12. An electrode for a membrane-electrode assembly, comprising:

a catalyst; and an ionomer having a hydrophilic group attached to an end of a side chain thereof, wherein the hydrophilic group is aligned toward the catalyst.

13. The electrode of claim 12, wherein the hydrophilic group includes at least one selected from the group consisting of a hydroxyl group, a carboxyl group, a nitro group, a sulfonic acid group, and a combination thereof.

14. The electrode of claim 12, wherein the ionomer includes at least one selected from the group consisting of sulfonated polyimide (S—PI), sulfonated polyarylethersulfone (S-PAES), sulfonated polyetheretherketone (S-PEEK), perfluorosulfonic acid resin (perfluorosulfonic acid, PFSA), sulfonated polybenzimidazole (S—PBI), sulfonated polysulfone (S—PSU), sulfonated polystyrene (S—PS), sulfonated polyphosphazene, and a combination thereof.

15. The electrode of claim 12, wherein the catalyst includes a platinum catalyst, or an alloy catalyst of platinum and at least one selected from the group consisting of cobalt (Co), nickel (Ni), manganese (Mn), iron (Fe), chromium (Cr), and a combination thereof.

* * * * *